United States Patent [19]

Huber

[11] Patent Number: 5,056,194
[45] Date of Patent: Oct. 15, 1991

[54] HINGE FOR USE IN SERVING CARTS AND THE LIKE

[75] Inventor: Thomas Huber, Oberkulm, Switzerland

[73] Assignee: Romay AG, Oberkuln, Switzerland

[21] Appl. No.: 316,222

[22] Filed: Feb. 27, 1989

[30] Foreign Application Priority Data

Feb. 26, 1988 [CH] Switzerland ............................ 721/88

[51] Int. Cl.$^5$ ............................................. E05D 3/06
[52] U.S. Cl. ........................................ 16/366; 16/379; 16/381
[58] Field of Search ................. 16/368, 366, 371, 379, 16/381

[56] References Cited

U.S. PATENT DOCUMENTS

| 378,861 | 3/1888 | Atwood | 16/366 |
| 730,876 | 6/1903 | Christ | 16/381 |
| 2,494,682 | 1/1950 | Aspin | 16/371 |
| 2,561,206 | 7/1951 | Kaspar | 16/379 |
| 4,610,560 | 9/1986 | Miller | 16/366 |

FOREIGN PATENT DOCUMENTS 825285 12/1959 United Kingdom ................. 16/366

Primary Examiner—Robert L. Spruill
Assistant Examiner—Carmine Cuda
Attorney, Agent, or Firm—Peter K. Kontler

[57] ABSTRACT

A hinge for use in serving carts to secure a pivotable door to the housing of the cart has a first pintle mounted in lugs provided in one vertical marginal portion of a sidewall forming part of the housing of a cart, a second pintle mounted in lugs extending from one vertical marginal portion of the door, and leaves which have holes or bores for both pintles and alternate with the lugs. At least one of the pintles is non-rotatably connected to the respective lugs or to the leaves. If the second pintle is non-rotatably connected to the leaves, it is pivotable with the leaves between a closed position and a position in whichis it coplanar with the sidewall carrying the first pintle, thereupon with the leaves to a position at right angles to and outwardly adjacent the sidewall, and thereafter to a fully open position which it reaches by pivoting about the axis of the second pintle and relative to the leaves. The sidewall and the door shield the leaves and the pintles in each position of the door.

13 Claims, 4 Drawing Sheets

HINGE FOR USE IN SERVING CARTS AND THE LIKE

BACKGROUND OF THE INVENTION

The invention relates to hinges in general, and more particularly to improvements in hinges which can be used in serving carts or tea carts. The invention also relates to devices, such as serving carts, which embody the improved hinge.

A serving cart which is used by hostesses on aircraft is normally provided with at least one door which is mounted on a so-called piano hinge (also called continuous hinge). An advantage of a piano hinge is that it permits a pivoting of the door through an angle of 270°, namely, between a closed or sealing position in front of the opening at one end of the housing of the cart and a second position adjacent the outer side of one sidewall of the housing. This ensures that the pivotable door takes up little room in fully open position, i.e., that it does not contribute significantly to the width of the cart and does not affect its ability to advance along the narrow aisle in an aircraft, train, bus or other conveyance for large numbers of passengers. Another advantage of a piano hinge is that it prevents the pivotable door from sagging and/or becoming twisted as well as that it permits pivoting of the door with a minimum of effort. However, a piano hinge also exhibits certain drawbacks, particularly as concerns its useful life. Thus, and since the hinge is adjacent the outer side of the sidewall which supports the pivotable door, it is likely to be struck by a chair which is adjacent the aisle, by a piece of luggage which protrudes into the aisle, by an oncoming cart or by the luggage carried by a passenger who attempts to move past the cart. Therefore, such conventional hinges must be repaired or replaced at frequent intervals.

OBJECTS OF THE INVENTION

An object of the invention is to provide a novel and improved hinge which can replace a standard piano hinge and is less likely to be damaged or destroyed than a standard hinge.

Another object of the invention is to provide a device, particularly a serving cart or tea cart, which embodies one or more improved hinges.

A further object of the invention is to provide a hinge which exhibits all advantages but does not embody the drawbacks of heretofore known hinges which are used for the doors of serving carts and like conveyances.

An additional object of the invention is to provide a novel and improved pintle and novel and improved leaves for use in the above outlined hinge.

A further object of the invention is to provide a simple, compact and inexpensive hinge which can be installed in existing carts as a superior substitute for heretofore known hinges.

Still another object of the invention is to provide a hinge which can be readily concealed and shielded in each and every position of the part which is pivotably mounted thereon.

SUMMARY OF THE INVENTION

One feature of the invention resides in the provision of a hinge which can be used to pivotally secure a first component to a second component, particularly to connect a door to the housing of a serving cart or tea cart. The improved hinge comprises a first pintle which is to be mounted in one of the components, a second pintle which is adjacent and preferably parallel to the first pintle and can be mounted in the other component, a plurality of leaves each of which has bearings for the first and second pintles (the leaves are disposed one behind the other in the axial direction of the pintles), and means for non-rotatably connecting at least one pintle to the respective component or to the leaves.

The connecting means can comprise cooperating male and female blocking elements on the at least one pintle and on the leaves. The female blocking element can comprise an axially parallel groove or flute in the at least one pintle, and the male blocking element can comprise a tongue provided on each of the leaves and extending into the groove. The groove can be replaced with a plurality of discrete recesses, at least one for each leaf, and each leaf can be provided with a projection extending into the respective recess. The at least one pintle can be mounted in the door of a serving cart.

Another feature of the invention resides in the provision of a serving cart, particularly for use in the aisles of aircraft, trains, buses and other large conveyances in which food and/or beverages are served to passengers. The improved cart comprises a frame member, a door member, and a hinge for pivotally securing the door member to the frame member. The hinge comprises a first pintle which is mounted in the frame member, a second pintle which is parallel to and adjacent the first pintle and is mounted in the door member, a plurality of leaves each of which has bearings for the first and second pintles (the leaves are disposed one behind the other in the axial direction of the pintles), and means for non-rotatably connecting at least one of the pintles to the respective member or to the leaves. As explained above, the connecting means can include cooperating male and female blocking elements on the at least one pintle and on the leaves or on the respective (frame or door) member. The female blocking element can comprise a groove in the at least one pintle (particularly an axially parallel groove), and the male blocking element can comprise a tongue provided on each of the leaves and extending into the groove of the at least one pintle.

In accordance with a presently preferred embodiment, the at least one pintle is the second pintle. The door member is then rotatable relative to the second pintle. The arrangement may be such that the door member can pivot with the leaves about the axis of the first pintle through an angle of approximately 180°, and that the door member is pivotable relative to the leaves through approximately 90° about the axis of the second pintle.

The frame member can include a series or row of first lugs which alternate with the leaves in the axial direction of the pintles, and the first pintle extends through such lugs. The door member can be provided with a series or row of second lugs which alternate with the leaves in the axial direction of the pintles, and the second pintle then extends through the second lugs. The door member is pivotable relative to the frame member between a first position in which the second lugs are disposed at one side of the first lugs, a second position in which the second lugs are aligned with the first lugs, and a third position in which the second lugs are disposed at the other side of the first lugs. The movement between the first and second positions can include pivoting of the door member and of the leaves about the axis of the first pintle, and the movement between the second and third positions can include pivoting of the door member and of the leaves about the axis of the first pintle and pivoting of the door member relative to the leaves about the axis of the second pintle.

The diameter of one of the pintles can exceed the diameter of the other pintle.

The novel features which are considered as characteristic of the invention are set forth in particular in the appended claims. The improved hinge itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
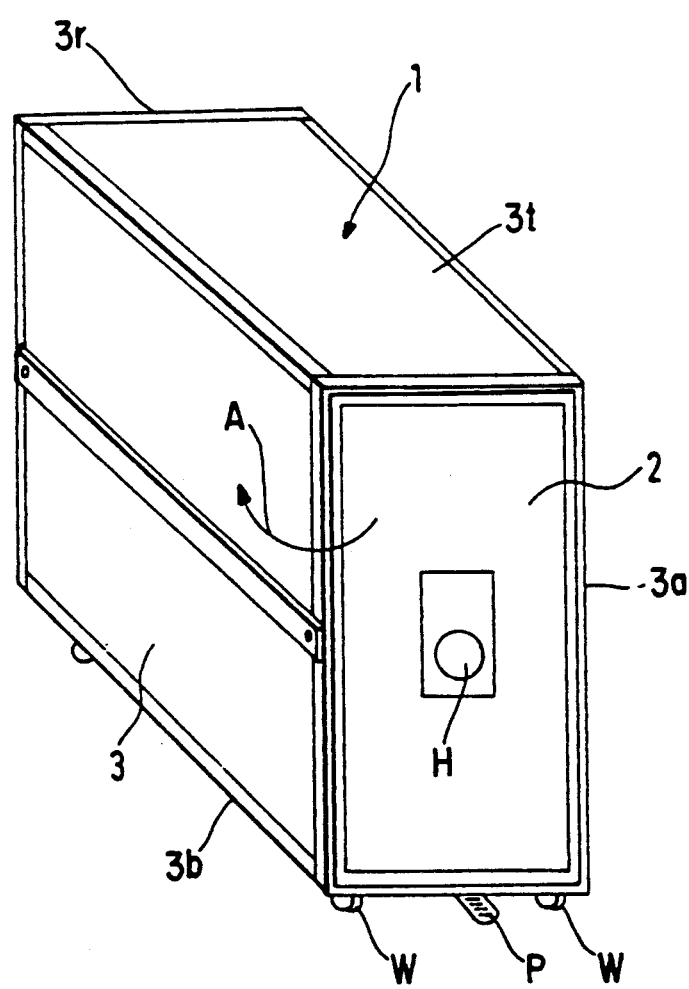
FIG. 1 is a perspective view of a serving cart with a pivotable door which is movably mounted on one sidewall of the housing by a hinge embodying one form of the present invention.
Figure 2:
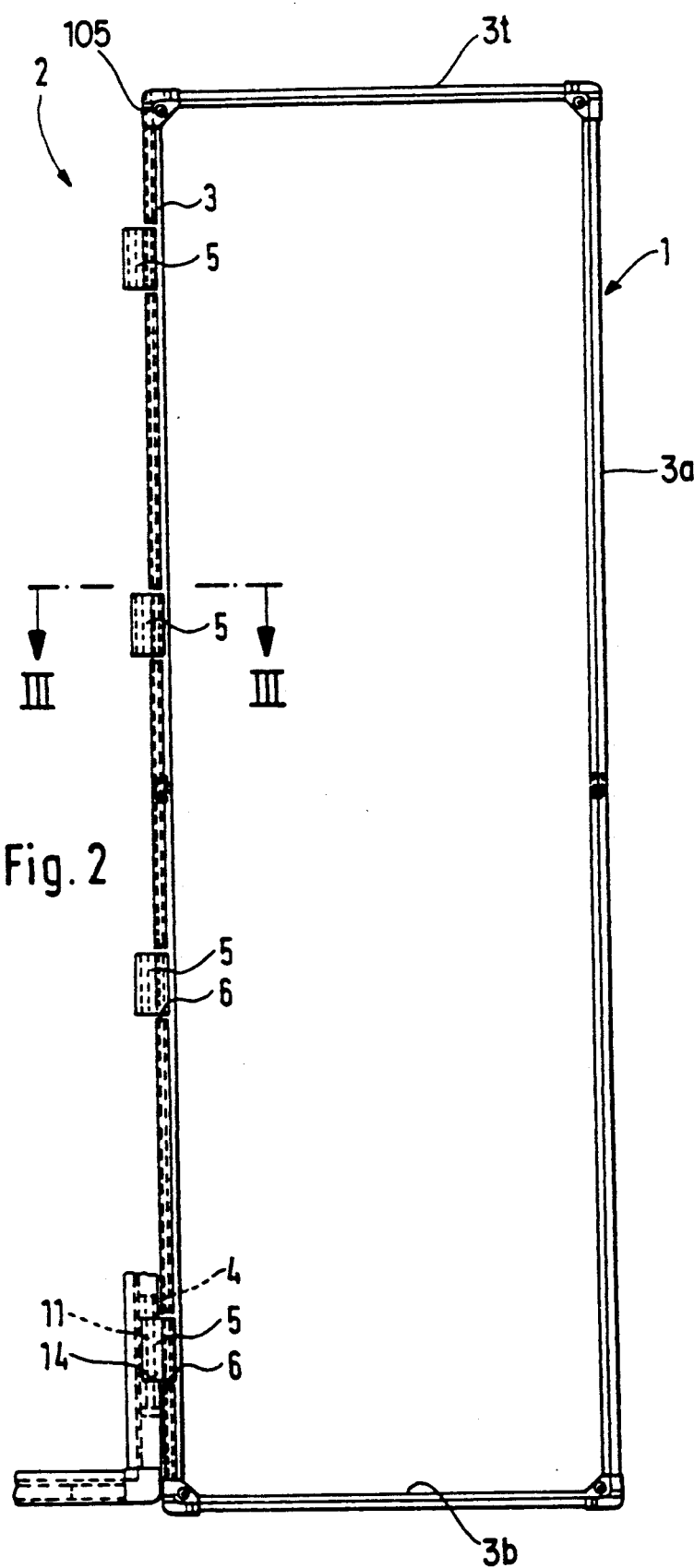
FIG. 2 is an enlarged front elevational view of the cart with the wheels and pedal omitted, the door being shown in a partly open position.
Figure 4:
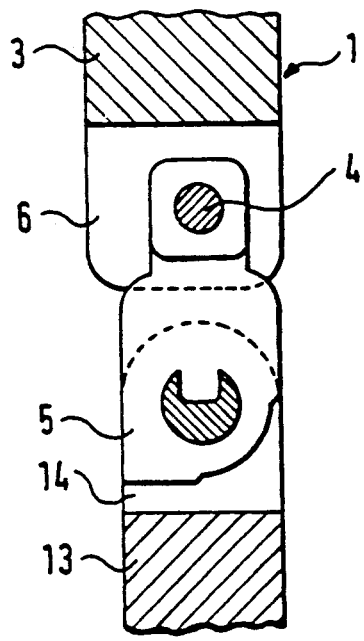
FIG. 4 is a sectional view similar to that of FIG. 3 but showing the door in partly open position.
Figure 5:
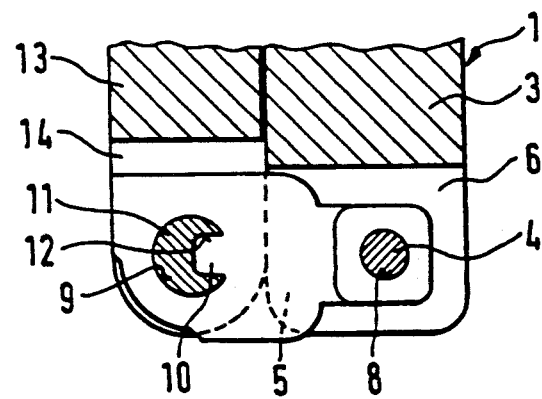
FIG. 5 is a sectional view similar to that of FIG. 3 but showing the door in fully open position.
Figure 6:
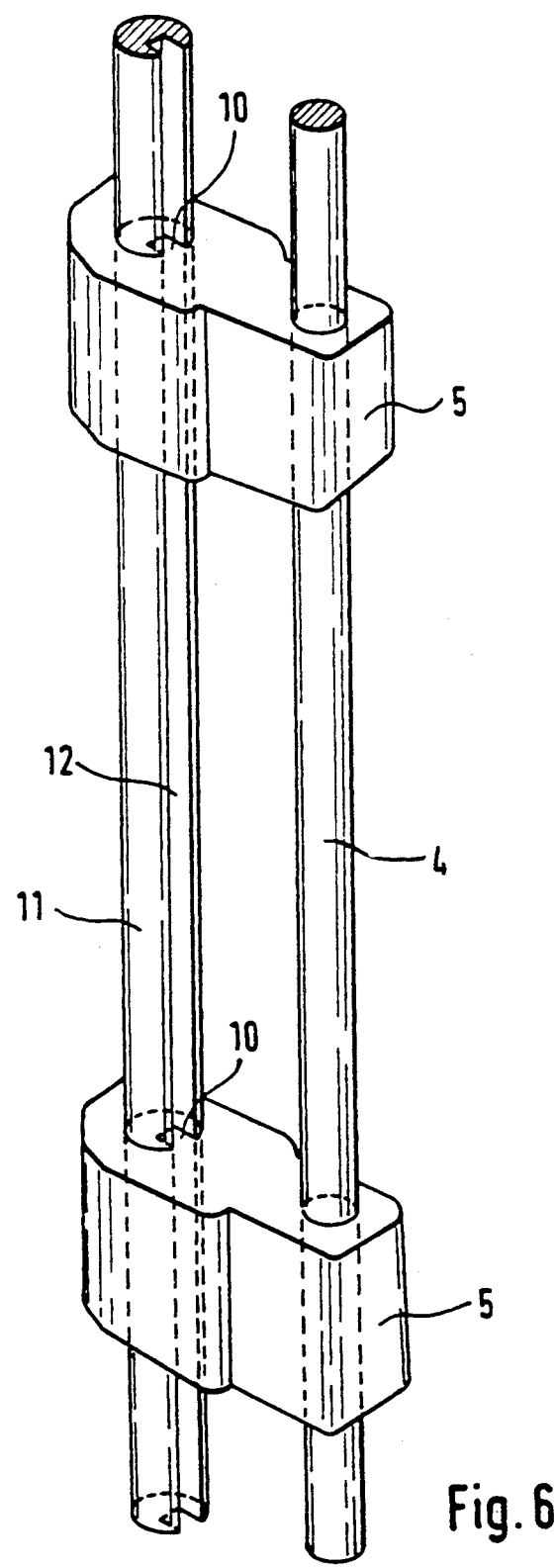
FIG. 6 is an enlarged fragmentary perspective view of the pintles and of two leaves in the hinge which is used in the cart of FIG. 1.

The serving cart or tea cart which is shown in FIG. 1 comprises a wheel-mounted housing 1 having two sidewalls 3 and 3a, a top wall 3t, a bottom wall 3b a rear end wall 3r and a front wall 2 which constitutes a door pivotable relative to the housing 1 in and counter to the direction which is indicated by an arrow A. The housing 1 is mounted on wheels W (e.g., caster wheels which can rotate about horizontal axes in frames pivotably mounted on the bottom wall 3b for angular movement about vertical axes). The cart further comprises a pedal P which can be depressed to lock at least one of the wheels W. The outer side of the door 2 has a handle H to facilitate pivoting of the door between a closed position (FIGS. 1, 2 and 3) and a fully open position (FIG. 5). FIG. 4 shows the door 2 in a partly open position in which the door is substantially coplanar with the sidewall 3. When the door 2 is moved to the partly or fully open position, it affords access to the interior of the housing 1, for example, to beverages, trays with meals, napkins, cups, forks, spoons, knives and/or other utensils which are stored in serving carts for use in aircraft. The width of the housing 1 between the sidewalls 3 and 3a is less than the width of the aisles in an aircraft.

Those portions of the sidewalls 3 and 3a, top wall 3t and bottom wall 3b which are adjacent the open end of the housing 1 can be said to constitute a rectangular frame member for the door 2. That portion of the sidewall 3 which forms part of the frame member is provided with a series of spaced-apart projections in the form of lugs 6 defining several recesses and being traversed by a first pintle 4. The recesses between the lugs 6 receive portions of leaves 5 which have bearings surrounding holes or bores 8 for and are traversed by the pintle 4. The adjacent marginal portion of the door 2 is also provided with projections in the form of lugs 14 which alternate with recesses and receive portions of the leaves 5. Such portions of the leaves 5 have bearings for a second pintle 11 which extends through the lugs 14 and is parallel to the pintle 4. The pintle 4 has a cylindrical cross-sectional outline and a diameter smaller than the diameter of the pintle 11. The latter includes a female blocking element in the form of an axially parallel groove 12 which receives male blocking elements in the form of tongues 10 provided on the adjacent portions of leaves 5. This ensures that the leaves 5 cannot rotate about the axis of the pintle 11; however, the lugs 14 of the door 2 can turn about the axis of the pintle 11. Each of the pintles 4, 11 can extend the full distance between the top wall 3t and the bottom wall 3b of the housing 1. A protective cap 105 is applied to the door 2 to overlie the upper end portions of the pintles 4 and 11.

The recesses between the lugs 6 of the frame member for the door 2 permit access to the corresponding portions of the pintle 4 from three sides, namely from the inner side of the sidewall 3, from the outer side of the sidewall 3, and from the front side of the housing 1. The lugs 6 are preferably equidistant from each other in the axial direction of the pintle 4. Each lug 6 has a bore or hole surrounded by a friction bearing for the respective portion of the pintle 4. Each leaf 5 can turn about the axis of the pintle 4, and this pintle 4 can turn about its own axis relative to the lugs 6 of the sidewall 3 (i.e., with reference to that portion of the frame member for the door 2 which is defined by the front end portion of the sidewall 3.

The pintle 11 extends through aligned bores or holes 9 which are provided in the respective portions of the leaves 5. The tongues 10 are integral projections of the leaves 5 and can be designed in such a way that they completely fill the respective portions of groove 12 in the peripheral surface of the pintle 11. The surfaces bounding the groove 12 and the tongues 10 constitute a means for blocking rotation of the leaves 5 relative to the pintle 11 and/or vice versa. The pintle 11 can be detached from the leaves 5 only by moving axially (e.g., upwardly) in response to removal of the cap 105. The character 13 denotes the panel (i.e., the major portion) of the door 2.

Figure 3:
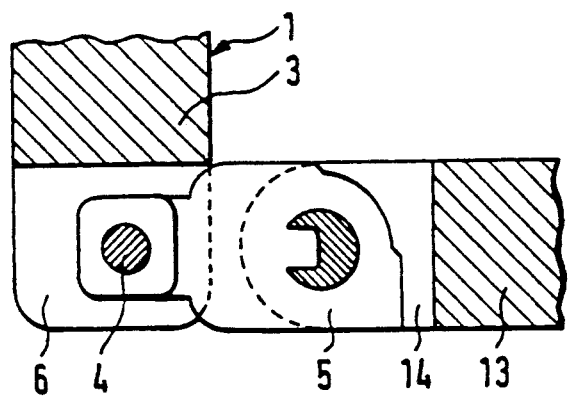
FIG. 3 is a sectional view substantially as seen in the direction of arrows from the line III—III of FIG. 1, with the door shown in closed position.

FIG. 3 shows the positions of the panel 13 and leaves 5 in closed position of the door 2. The lugs 14 are located at one side of the lugs 6 and in front of the open front side of the housing 1. The entire hinge including the pintles 4, 11 and the leaves 5 is located inwardly of the outer side of the sidewall 3 so that the hinge is not likely to be damaged while the cart is rolled in an aisle and its sidewall 3 or 3a happens to bump into seats, into pieces of luggage or into other objects which extend from the adjacent seats into the aisle.

The operator, e.g., a hostess, can pivot the panel 3 and the leaves 5 as a unit between the positions of FIGS. 3 and 4. This moves the lugs 6 and 14 into alignment, i.e., the plane of the panel 13 then coincides or practically coincides with the plane of the sidewall 3. Such pivoting of the panel 13 and of the leaves 5 takes place about the axis of the pintle 4 which can but need not rotate relative to the lugs 6.

If the operator desires to move the door 2 to a fully open position (note FIG. 5), the panel 13 is pivoted with the leaves 5 until the leaves reach the positions of FIG. 5. The panel 13 is then pivoted relative to the leaves 5 about the axis of the pintle 11 until it reaches the position of FIG. 5 in which its lugs 14 are located at the other side of the lugs 6. The panel 13 then lies flush or substantially flush against the outer side of the sidewall 3 so that it occupies a minimum of space and adds little to the overall width of the cart, i.e., to the combined width of the housing 1 and panel 13.

The hinge is fully protected when the panel 13 assumes the position of FIG. 4 because the leaves 5 and the pintles 4, 11 are then located between the sidewall 3 and the panel 13. The hinge is also protected when the door 2 is moved to the position of FIG. 5 because the leaves 5 and the lugs 14 have rounded portions which are outwardly adjacent and protect the pintle 11. At such time, the pintle 4 is located to the right of the pintle 11 and is even less likely to be damaged, especially since an attendant will normally stand in front of the open front side of the housing 1.

The feature that at least one of the pintles 4, 11 cannot turn relative to the leaves 5 and/or relative to the sidewall 3 and panel 13, respectively, ensures that the play of the hinges suffices to permit ready pivotability of the panel 13 between the positions of FIGS. 3 and 5 without sagging and/or twisting.

The improved hinge can be modified in a number of ways without departing from the spirit of the invention. For example, and as already mentioned above, it is possible to provide blocking means between the sidewall 3 (i.e., the lugs 6) and the pintle 4, between the pintle 4 and the leaves 5, or between the panel 13 (lugs 14) and the pintle 11. Still further, it is possible to non-rotatably mount the pintles 4 and 11 in the respective lugs 6 and 14, and to rotatably mount the leaves 5 on the pintles 4 and 11. This would merely necessitate the provision of male and female blocking elements on other parts of the hinge, on the panel 13 and/or on the sidewall 3. It is further clear that each pintle can be assembled of two or more coaxial sections, that the rear wall 3r can be mounted on the sidewall 3 or on the sidewall 3a of the housing 1 in a manner similar to or identical with that shown for mounting of the door 12, and that the improved hinge can be used in pieces of furniture and many additional devices other than a tea cart or serving cart.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should are are intended to be comprehended within the meaning and range of equivalence of the appended claims.

I claim:

1. A hinge for pivotally securing a first component to a second component comprising a first pintle arranged to be mounted in and so as to extend through a portion of one of the components; a second pintle adjacent and parallel to the first pintle and arranged to be mounted in and so as to extend through a portion of the other of the components; a plurality of leaves each having bearings for the first and second pintles, said leaves being disposed one behind the other in the axial direction of said pintles and being arranged to connect said pintles to each other for movement of the pintle in the first component to and from a position in which the first component lies substantially flush against the second component; and means for non-rotatably connecting at least one of said pintles with one of the parts including (a) the respective component and (b) said leaves.

2. The hinge of claim 1, wherein said connecting means includes cooperating male and female blocking elements on said leaves and on said at least one pintle.

3. A hinge for pivotally securing a first component to a second component, particularly for connecting a door to a housing of a serving cart, comprising a first pintle arranged to be mounted in one of the components; a second pintle adjacent and parallel to the first pintle and arranged to be mounted in the other of the components; a plurality of leaves each having bearings for the first and second pintles, said leaves being disposed one behind the other in the axial direction of said pintles; and means for non-rotatably connecting at least one of said pintles with one of the parts including (a) the respective component and (b) said leaves, said connecting means comprising cooperating male and female blocking elements on said leaves and said at least one pintle, said female blocking element comprising an axially parallel groove in said at least one pintle and said male blocking elements comprising tongues provided on said leaves and extending into said groove.

4. The hinge of claim 3, for pivotally securing a door to a housing of a serving cart, wherein said at least one pintle is arranged to be mounted in the door of the cart.

5. A serving cart comprising a frame member; a door member; and a hinge for pivotally securing the door member to the frame member, including a first pintle mounted in and extending through a portion of the frame member, a second pintle parallel to and adjacent said first pintle and mounted in and extending through a portion of the door member, a plurality of leaves each having bearings for said first and second pintles, said leaves being disposed one behind the other in the axial direction of said pintles and connecting said pintles to each other for movement of the door member between a closed position and an open position in which the door member lies substantially flush against the frame member, and means for non-rotatably connecting at least one of said pintles to one of the parts including (a) said leaves and (b) the respective member.

6. The cart of claim 5, wherein said connecting means includes cooperating male and female blocking elements on said leaves and on said at least one pintle.

7. The cart of claim 5, wherein said door member is pivotable with said leaves about the axis of said first pintle through an angle of substantially 180° and said door member is pivotable relative to said leaves through approximately 90 degrees about the axis of said second pintle.

8. The cart of claim 5, wherein said frame member includes a plurality of first lugs which alternate with said leaves in the axial direction of said pintles and said first pintle extends through said first lugs, said door member having a plurality of second lugs which alternate with said leaves in the axial direction of said pintles and said second pintle extends through said second lugs, said door member being pivotable relative to said frame member between a first position in which said second lugs are disposed at one side of said first lugs, a second position in which said first lugs are aligned with said second lugs, and a third position in which said second lugs are disposed at the other side of said first lugs.

9. The cart of claim 8, wherein the movement of said door member between first and second positions includes pivoting of said door member and of said leaves about the axis of said first pintle and the movement between said second and third positions includes pivoting of said door member and of said leaves about the axis of said first pintle and pivoting of the door member relative to said leaves about the axis of said second pintle.

10. The cart of claim 5, wherein the diameter of one of said pintles exceeds the diameter of the other of said pintles.

11. A serving cart comprising a frame member; a door member; and a hinge for pivotally securing the door member to the frame member, including a first pintle mounted in the frame member, a second pintle parallel to and adjacent said first pintle and mounted in the door member, a plurality of leaves each having bearings for said first and second pintles, said leaves being disposed one behind the other in the axial direction of said pintles, and means for non-rotatably connecting at least one of said pintles to one of the parts including (a) said leaves and (b) the respective member, said connecting means including cooperating male and female blocking elements on said leaves and on said at least one pintle, said female blocking element comprising an axially parallel groove in said at least one pintle and said male blocking element comprising a tongue provided on each of said leaves and extending into said groove.

12. The cart of claim 11, wherein said at least one pintle is said second pintle.

13. The cart of claim 12, wherein said door member is rotatable relative to said second pintle.

* * * * *